United States Patent Office 3,414,541
Patented Dec. 3, 1968

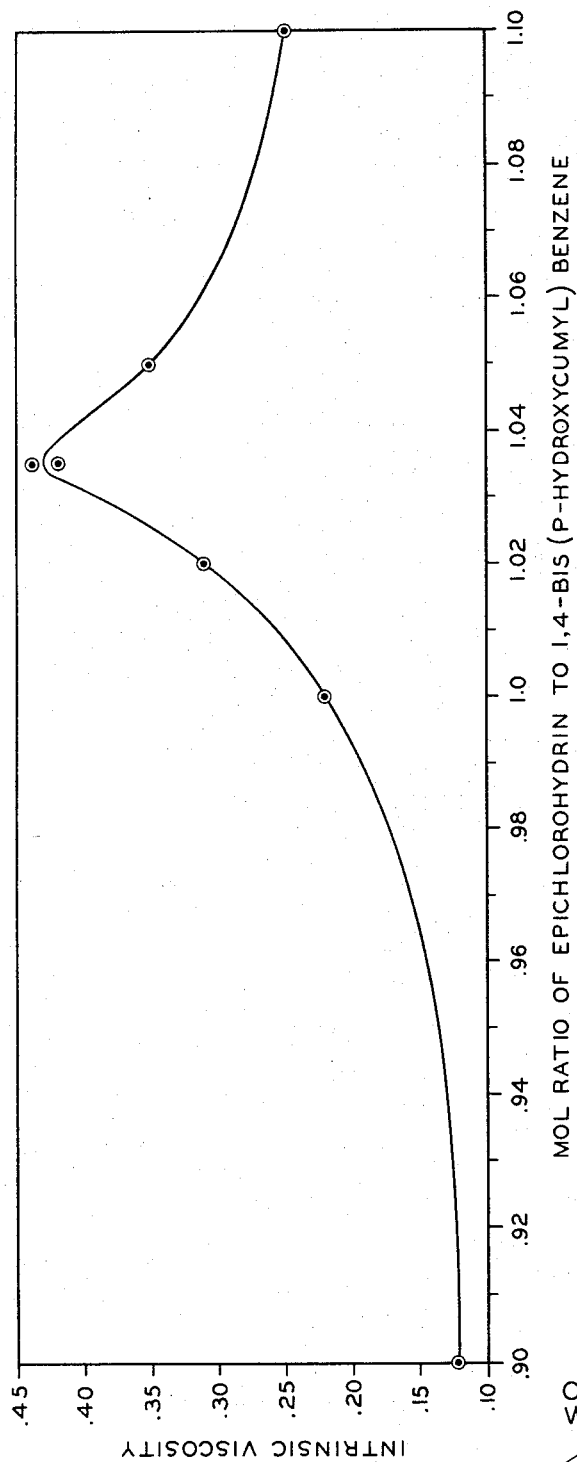

3,414,541
THERMOPLASTIC RESIN REACTION PRODUCT OF 1,4-BIS(p-HYDROXYCUMYL)BENZENE WITH EPICHLOROHYDRIN
Oliver A. Barton, Florham Park, and Walter W. Littell, Mount Tabor, N.J., assignors to Allied Chemical Corporation, New York, N.Y., a corporation of New York
Filed July 13, 1964, Ser. No. 381,973
7 Claims. (Cl. 260—47)

ABSTRACT OF THE DISCLOSURE

This specification discloses a novel high molecular weight thermoplastic resin and a process for preparing it whereby 1,4-bis(p-hydroxycumyl)benzene is reacted with epichlorohydrin in a molar ratio of 1:1.02 to 1:1.07 in the presence of an alkali. The polymers of the invention are useful for the preparation of molded articles, self-sustaining films, and adhesives.

In co-pending application Ser. No. 140,221, filed Sept. 25, 1961, there is disclosed 1,4-bis(p-hydroxycumyl)benzene having the structural formula

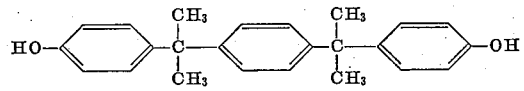

This bisphenolic compound is prepared by reacting the dicarbinol of 1,4-diisopropylbenzene with phenol in the presence of anhydrous HCl as illustrated in the following equation:

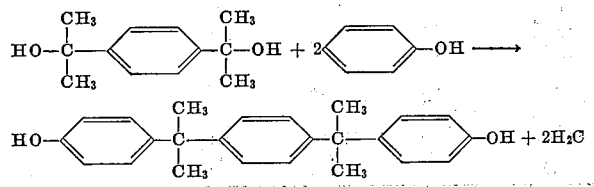

In a later filed application, Ser. No. 159,775, filed Dec. 15, 1961, now U.S. Patent 3,301,818 issued Jan. 31, 1967, there are disclosed epoxy resins prepared by the reaction of 1,4-bis(p-hydroxycumyl)benzene with epichlorohydrin. As is typical of epoxy resins, prior to curing, the resins exemplified in application Ser. No. 159,775 are either liquids or semi-solids of little physical strength. These resins can be crosslinked to form useful polymers by curing them with conventional epoxide resin curing agents such as diethylene triamine, diethylamino propylamine, and metaphenylene diamine. However, the resulting cured resins are not suitable for use requiring a highly ductile material.

It is therefore an object of the present invention to provide novel solid thermoplastic resins of relatively high ductility and strength, useful for molding into shaped articles and for adhesive purposes, directly without further cure or cross-linkage.

Another object of the present invention is to prepare such valuable products from 1,4-bis(p-hydroxycumyl)benzene and epichlorohydrin.

Additional objects and advantages of the present invention will become apparent from the following detailed description thereof.

In accordance with this invention, solid thermoplastic resins having the aforementioned valuable properties are prepared by reacting 1,4-bis(p-hydroxycumyl)benzene with epichlorohydrin using from about 1.02 to 1.07 mols of epichlorohydrin per mol of 1,4-bis(p-hydroxycumyl)benzene. The product obtained has a very high molecular weight as indicated by a minimum intrinsic viscosity of about 0.30 in dioxane at 25° C. Outside of the above critical molar ratio, the polymeric product has an intrinsic viscosity of less than about 0.30 and does not possess sufficient physical strength to be useful as a thermoplastic material. If less than 1.02 mols epichlorohydrin are employed per mol of 1,4-bis(p-hydroxycumyl)benzene, there is not sufficient epichlorohydrin present to form chains of sufficient length. On the other hand, as the molar ratio of epichlorohydrin to 1,4-bis(p-hydroxycumyl)benzene is increased above 1.07 to 1, there are obtained shorter and shorter epoxide group terminated chains with the products requiring crosslinking with a curing agent to give structural strength. A preferred product having an intrinsic viscosity of at least about 0.35 can be obtained if the molar ratio of epichlorohydrin to 1,4-bis(p-hydroxycumyl)benzene is from about 1.025:1 to 1.05:1. The criticality of the molar ratio of the epichlorohydrin to 1,4-bis(p-hydroxycumyl)benzene with regard to the molecular weight of the polymeric product obtained by their reaction is shown in the drawing which is a plot of the molar ratio against the intrinsic viscosity as measured in dioxane at 25° C.

The reaction must be carried out in the presence of an alkali, preferably an alkali metal hydroxide such as sodium hydroxide, potassium hydroxide and lithium hydroxide. The alkali is used in an amount sufficient to neutralize the HCl produced during the reaction and to transform the chlorohydrin formed on initial condensation of the bisphenol with epichlorohydrin to an epoxide containing molecule. In general it is preferred to use a molar ratio of alkali to 1,4-bis(p-hydroxycumyl)benzene of from about 1.0:1 to 1.4:1, with optimum results being obtained with a molar ratio in the range of about 1.1:1 to 1.2:1.

The reaction of the 1,4-bis(p-hydroxycumyl)benzene with epichlorohydrin is preferably carried out at a temperature of about 40 to 150° C. Optimum results are obtained when the reaction is conducted at a temperature of about 50 and 110° C.

It is preferable to carry out the reaction in a solvent medium. Particularly good solvents are aliphatic monohydric alcohols of 1 to 5 carbon atoms such as methanol, ethanol, isopropanol, and butanol. It is also preferred to have some water present to aid in the initiation of the reaction. Quantities of water equal to at least 0.3% of the total weight of the reaction mixture have proved effective. Water can be conveniently provided in the reaction system by adding the alkali in the form of an aqueous solution.

Because the polymers of the present invention are composed of long chains, the epoxide equivalent or weight in grams of resin containing 1 gram equivalent of epoxide group is very high. While it is difficult to accurately determine epoxide equivalents when relatively very few epoxide groups are present, it is believed that the polymers of the present invention possess epoxide equivalents of over 5,000. As a result of having so few epoxide groups, the polymers of the present invention cannot be effectively crosslinked by conventional epoxide curing agents such as primary aliphatic amines which crosslink by opening the epoxide ring. If it is desired to convert the thermoplastic resin of this invention to a thermoset material, this can be accomplished by the use of a curing agent such as toluene diisocyanate which crosslinks through the OH groups on the chain.

The polymers of the present invention are ductile, thermoplastic materials having excellent physical strength. These polymers can be molded, extruded or applied from a solution, and can be used in films, coatings, adhesives, shaped articles, or any other application suitable for a thermoplastic material possessing its properties.

The following example is given to further illustrate the invention, but it is to be understood that the invention is not to be limited in any way by the details described therein.

EXAMPLE 1

A series of experiments were conducted in accordance with the following procedure. 1,4-bis(p-hydroxycumyl) benzene, epichlorohydrin and isopropanol were placed in a flask fitted with a stirrer, condenser, thermometer and heating means. The reaction mixture was heated with stirring to reflux temperature and sodium hydroxide in a 10% aqueous solution was added. After the addition of the sodium hydroxide, the reaction mixture was refluxed for two hours. The polymer produced was removed from the alcohol-water mixture and extracted three times in a Waring Blender with quantities of water equal to three times the volume of the solid. The exact quantities of the reactants used in each experiment, the conditions and the products obtained are set forth in Table I wherein 1,4-bis(p-hydroxycumyl) benzene is abbreviated to BHCB. Runs 1–4 of Table I illustrate the process and product of the present invention, while Runs 5–7 were conducted outside the critical range for the molar ratio of epichlorohydrin to 1,4-bis(p-hydroxycumyl)benzene and indicate that a lower molecular weight polymer is thus obtained.

trinsic viscosity of 0.25. However, because of the brittleness and relatively poor physical strength of this polymer, the test sample cracked while being removed from the mold.

To test the product of the invention as an adhesive, polymer crumb from Run 3 was distributed as a layer and compressed at 160° C. between polished chromium plated "Apollo" plates held at 5–7 mil spacing. After the assembly had been cooled on Dry Ice, the polymer was removed as a unitary ductile film or sheet and clamped within a one-half inch over-lap between two aluminum strips 1″ x $\frac{1}{16}$″. The assembly was heated to 180° C. to cause the polymer to wet the aluminum surface. It was then cooled to room temperature and tested for tensile shear bond strength (ASTM Test D–1002). A value of 2000 pounds per square inch was obtained. It is noteworthy that this value was obtained without the addition of any material such as powdered metal for reducing elongation.

It will be apparent that many modifications and variations may be effected without departing from the scope of the novel concepts of the present invention, and the details disclosed are not to be construed as imposing undue limitations on the invention.

We claim:

1. A ductile thermoplastic resin having an intrinsic viscosity of at least about 0.30 in dioxane at 25° C., said resin being the reaction product of 1,4-bis(p-hydroxycumyl)benzene and epichlorohydrin in the presence of an alkali and at least 0.3 percent by weight of water based on the total weight of the reaction mixture, employing from 1.02 to 1.07 mols of epichlorohydrin for each mol of 1,4-bis(p-hydroxycumyl)benzene and from 1.0 to 1.4 mols of alkali for each mol of 1,4-bis(p-hydroxycumyl) benzene, said reaction being conducted at a temperature of about 40–150° C.

TABLE I

| Description | Run 1 | Run 2 | Run 3 | Run 4 | Run 5 | Run 6 | Run 7 |
|---|---|---|---|---|---|---|---|
| Mole ratio, Epi/BHCB | 1.05:1.0 | 1.035:1.0 | 1.035:1.0 | 1.02:1.0 | 0.9:1.0 | 1.0:1.0 | 1.1:1.0 |
| Grams BHCB | 24.22 | 24.22 | 173 | 24.22 | 24.22 | 207.6 | 24.22 |
| Mols BHCB | .07 | .07 | .5 | .07 | .07 | .6 | .07 |
| Grams epichlorohydrin | 6.762 | 6.665 | 47.6 | 6.57 | 5.796 | 55.2 | 7.084 |
| Mols epichlorohydrin | .0735 | .0724 | .5175 | .0714 | .063 | .6 | .077 |
| Solvent (isopropanol), grams | 24.0 | 24.0 | 171.0 | 24.0 | 24.0 | 192.0 | 24.0 |
| Percent H₂O in system | (¹) | (¹) | (¹) | (¹) | (¹) | (¹) | (¹) |
| Grams NaOH in 10% aqueous solution | 3.23 | 3.2 | 22.7 | 3.14 | 3.1 | 26.4 | 3.36 |
| Mole ratio NaOH/BHCB | 1.155:1.0 | 1.135:1.0 | 1.135:1.0 | 1.122:1 | 1.1:1.0 | 1.1:1.0 | 1.2:1 |
| Grams product | 28.0 | 28.8 | 196 | 28.6 | 19.2 | 234 | 28.5 |
| Epoxide equivalent | 5450 | 11,350 | 14,800 | 12,350 | 5700 | 11,200 | 3440 |
| Softening Temperature, °C | | | | 201 | 169 | 191 | 200 |
| Intrinsic viscosity | .35 | .44 | .42 | .31 | .12 | .22 | .25 |

¹ Trace prior to NaOH addition.

The physical properties of the polymers having intrinsic viscosities in dioxane at 25° C. of at least 0.30 are given in Table II.

TABLE II

| | Polymer of Run 1 | Polymer of Run 2 | Polymer of Run 3 | Polymer of Run 4 |
|---|---|---|---|---|
| Ultimate tensile strength, p.s.i.¹ | 6,435 | 6,800 | 7,700 | 5,900 |
| Ultimate elongation, percent ¹ | 30.9 | 98 | 98 | 7.0 |
| Yield strength, p.s.i.¹ | 10,180 | 10,500 | 10,500 | |
| Tensile modulus, p.s.i.¹ | 140,054 | 155,700 | 169,600 | |
| Flexural strength, p.s.i.² | | | 13,400 | |
| Compression strength, p.s.i.³ | | | 11,300 | |
| Izod impact, ½″ bar, lbs./in. notch ⁴ | | | 1.2 | |
| Heat distortion temperature at 264 p.s.i., °C.⁵ | | 90 | 100 | |
| Rockwell Hardness, R scale ⁶ | | | 123 | |
| Softening point, °C.⁷ | | | 200 | 201 |

¹ ASTM Test D–638, with a 2″ per min. head speed.
² ASTM Test D–790.
³ ASTM Test D–695.
⁴ ASTM Test D–256.
⁵ ASTM Test D–1637.
⁶ ASTM Test D–785.
⁷ Durran's mercury method.

Attempts were made to determine the above physical properties for the polymer of Run 7 which had an in- 2. A thermoplastic resin as claimed in claim 1 possessing an intrinsic viscosity of at least 0.35 in dioxane at 25° C.

3. A process for producing a ductile thermoplastic resin having an intrinsic viscosity of at least about 0.30 in dioxane at 25° C. comprising reacting 1,4-bis(p-hydroxycumyl)benzene with epichlorohydrin in the presence of an alkali and at least 0.3 percent by weight of water based on the total weight of the reaction mixture employing about 1.02 to 1.07 mols of epichlorohydrin for each mol of 1,4-bis(p-hydroxycumyl)benzene and from 1.0 to 1.4 mols of alkali for each mol of 1,4-bis(p-hydroxycumyl)benzene, said reaction being conducted at a temperature of about 40–150° C.

4. A process as claimed in claim 3 wherein said alkali is an alkali metal hydroxide and about 1.1 to 1.2 mols of alkali are present for each mol of 1,4-bis(p-hydroxycumyl)benzene.

5. A process as claimed in claim 3 wherein said reaction is conducted in the presence of an aliphatic monohydric alcohol of 1 to 5 carbon atoms.

6. A process for producing a ductile thermoplastic resin having an intrinsic viscosity of at least about 0.30 in dioxane at 25° C. comprising reacting 1,4-bis(p-hydroxycumyl)benzene with epichlorohydrin employing about 1.02 to 1.07 mols of epichlorohydrin for each mol of 1,4-bis(p-hydroxycumyl)benzene, said reaction being conducted at temperature of about 40 to 150° C. in the presence of an aliphatic monohydric alcohol of 1 to 5 carbon atoms, at least 0.3 percent by weight of water based on the total weight of the reaction mixture and about 1.0 to 1.4 mols of an alkali metal hydroxide per mol of 1,4-bis(p-hydroxycumyl)benzene.

7. A process as claimed in claim 6 wherein about 1.025 to 1.05 mols of epichlorohydrin are present for each mol of 1,4-bis(p-hydroxycumyl)benzene.

References Cited
UNITED STATES PATENTS

| | | | |
|---|---|---|---|
| 3,251,805 | 5/1966 | Schnell et al. | 260—47 |
| 3,305,528 | 2/1967 | Wynstra et al. | 260—47 |

WILLIAM H. SHORT, *Primary Examiner.*

T. D. KERWIN, *Assistant Examiner.*